Patented Aug. 3, 1937

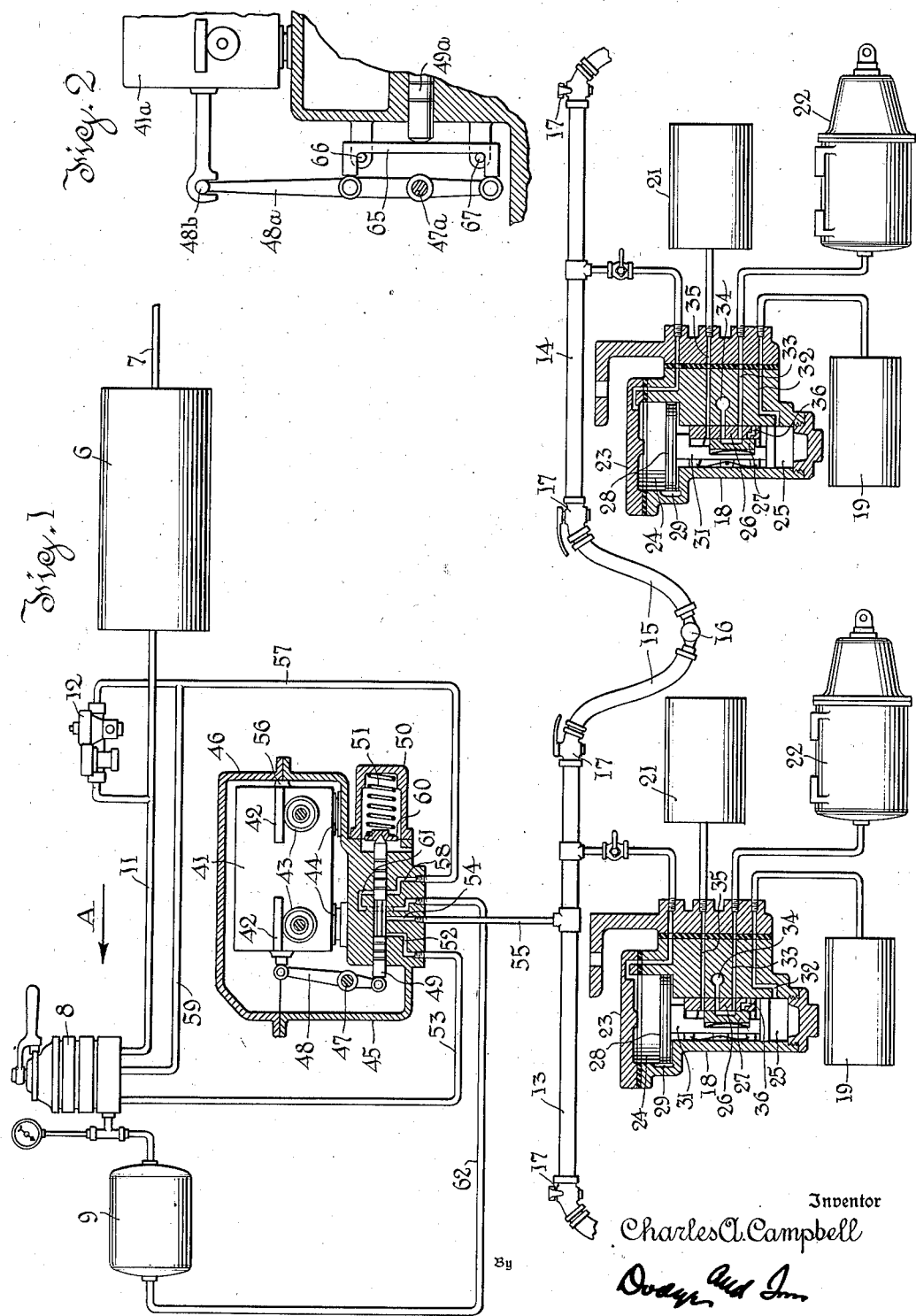

2,088,575

UNITED STATES PATENT OFFICE 2,088,575

FLUID PRESSURE BRAKE

Charles A. Campbell, Watertown, N. Y., assignor to The New York Air Brake Company, a corporation of New Jersey Application February 26, 1934, Serial No. 713,042
Renewed November 6, 1936

15 Claims. (Cl. 303—24)

This invention relates to air brakes, and provides a system in which a single deceleration controller regulates the brakes of an entire train as a unit by graduating operations performed on the brake pipe or some equivalent pipe extending throughout the train.

The invention is applicable to single vehicles as well as to train brake systems in which the brakes on the various cars are controlled by varying the pressure in a pipe extending throughout the car or train of cars. In some straight air and other systems such a pipe is commonly called a control pipe, and in automatic systems it is usually called a brake pipe. In the present application the term "train pipe" will be used as a generic term defining such a pipe irrespective of the type of brake system. The invention is applicable, with suitable modifications, to various systems, but because its application to an automatic system involves particular patentable features, the invention will be disclosed as applied to the brake pipe of such a system, and certain of the more specific claims will be directed thereto.

Deceleration control of a plurality of cars by a single deceleration controller has been proposed, but such proposed devices depended upon the use of electric circuits and electrically actuated valves, with attendant maintenance difficulties as well as harsh action attributable to the poor graduating action characteristic of the valves used.

According to the present invention, direct valvular control is applied to the brake pipe, in such a way as to secure smooth and progressive action. The brake system is of the automatic type with provision for graduated release, and means are provided whereby the deceleration control regulates the pressure in the equalizing discharge reservoir of the engineer's brake valve in consonance with the control directly exercised on the brake pipe.

No claim is here made to the structure of the deceleration controller or its general principles of operation. Certain structural features of the deceleration controller illustrated form the subject matter of my copending application Serial No. 724,990, filed May 10, 1934.

A simple embodiment of the invention will now be described by reference to the accompanying drawing, in which,—

Fig. 1 is a diagrammatic elevation of the equipment for a motor car and trailer, the deceleration controller and the automatic brake valves being shown in section. In this figure the parts are shown in running (release) condition. A single end equipment is shown.

Fig. 2 is a fragmentary view showing how the deceleration controller is modified to control vehicles which may run in either direction.

Referring first to Fig. 1, the main reservoir is shown at 6. This is charged with air under pressure through pipe 7, by any suitable means such as a compressor (not shown). An engineer's brake valve of the ordinary equalizing discharge type appears at 8 and is provided with the usual equalizing reservoir 9. A connection 11 leads from the main reservoir 6 to the brake valve 8 and to the usual feed valve 12.

The parts so far described are mounted on the motor car and may conform to standard practice on American steam railways.

The brake pipe 13 on the motor car is connected to the brake pipe 14 on the trailer by flexible hose 15 with couplings 16 and angle cocks 17. Additional trailers may be similarly connected. Each car is equipped with a braking unit comprising an automatic brake valve 18, here shown as a very simple triple valve of the graduated release type, an auxiliary reservoir 19, a supplemental (releasing) reservoir 21 and a brake cylinder 22.

Each triple valve comprises a body (to which the numeral 18 is applied) and a front cap 23 forming a piston chamber 24 and valve chamber 25. The valve chamber 25 is formed with a seat for the main slide valve 26 with which is associated a graduating slide valve 27 working on a seat on the back of the main slide valve. A triple piston 28 works in chamber 24 and controls a charging groove 29. The piston has a stem 31 which actuates the two valves, the graduating valve 27 being closely confined in a notch so that it partakes of all the motions of the piston, and the main slide valve 26 being permitted limited lost motion.

The auxiliary reservoir is connected by a pipe with port 32 which leads to slide valve chamber 25. The brake pipe 13 or 14 (as the case may be) is connected by a branch with the piston chamber 24 of the corresponding triple valve, the connections as usual being such that the piston 28 responds to pressure differentials between the brake pipe and auxiliary reservoir. The brake cylinder 22 is connected with brake cylinder port 33 in the seat for the main slide valve 26. In this seat are also an exhaust port 34 and a port 35 connected with reservoir 21.

When the slide valve 26 is in release position, as shown, extension ports through the slide valve 26 register with ports 33, 34 and 35 in the seat and a cavity in the graduating valve 27 connects such extensions of ports 32 and 34 permitting exhaust of the brake cylinder. In release position the extension of port 35 is open, but motion of piston 28 outward (upward in the drawing) causes graduating valve 27 to lap the extension of port 35 and immediately thereafter expose the upper end of service port 36 which is formed in slide valve 26. Port 36 registers with brake cylinder port 33 when slide valve 26 is shifted outward (upward in the drawing) to service position.

The triple valve above described will be recognized as a known form of graduated release triple valve and detailed description of its operation is unnecessary. The triple valves illustrated are intended merely to be typical of valves of this class, no novelty being claimed for the triple valve per se. Much more refined and complicated valves, familiar to those skilled in the art, may be substituted, but those illustrated are sufficient as a basis for explaining the invention.

The deceleration controller comprises an inertia mass or "weight" shiftable on the motor car in the direction of travel of the car, a combined admission and exhaust valve shifted by motion of said mass relatively to the car, and yielding means resisting motion of the mass forward relatively to the car from a normal position.

The inertia mass appears at 41 and is supported by flanges 42 on anti-friction rollers 43. Other anti-friction rollers 44 guide the weight against lateral displacement. The rollers 43 and 44 are carried by a body 45 which, together with a cover 46 encloses the inertia mass. Pivoted at 47 in body 45 is a lever 48 whose upper end is in thrust engagement with mass 41 and whose lower end is in thrust engagement with a balanced piston valve 49 slidable in a bore or valve chamber formed in the lower portion of body 45.

A coil compression spring 51 enclosed in cap 50, reacts through spring seat 60 on the end of valve piston 49. The car is supposed to travel in the direction of the arrow A on the drawing, and when the train is retarded mass 41 moves ahead (to the left in the drawing) against the opposition of spring 51. The amount of such motion for a given decelerative rate is determined by the strength and scale of spring 51. There is nothing in the present invention to preclude the use of an adjusting means for the spring, and various types of adjusting means for the loading springs of deceleration controllers are known in the art. Since the use of such a spring adjusting means does not affect the inventive principle here described and claimed it is deemed unnecessary to illustrate such means.

The valve 49 consists of two cylindrical end portions or heads connected by a reduced middle portion which in certain positions of the valve serves to connect ports formed in body 45. The relation and connections of these ports will now be described.

The port 52 is connected by pipe 53 with the brake pipe connection of the brake valve. A port 54 is connected by branch pipe 55 with the brake pipe 13 of the motor car. The port 52 is so located that when the inertia mass 41 is in the normal (rearward) position, to which it is urged by spring 51 and in which it is arrested by collision with stop 56, the port 52 is fully exposed to the reduced middle portion of the valve and thus connected with the port 54 which always communicates with the space in such reduced middle portion. If the mass 41 moves forward (to the left in the drawing) valve 49 is forced inward progressively blanking port 52 and thus throttling and finally closing the connection between the engineer's brake valve and the brake pipe.

The feed valve 12 receives its supply of air from main reservoir pipe 11 and functions to deliver air at reduced pressure to pipe 57 which leads to body 45 and there communicates with a port 58 normally blanked by the inner (right hand on the drawing) head of valve 49. A branch 59 of pipe 57 leads to the feed valve connection of the engineer's brake valve 8.

Directly opposed to port 58 is a port 61 connected by pipe 62 with the equalizing reservoir 9. Port 61 like port 58 is normally blanked by the inner head of valve 49, but when mass 41 moves forward and just after port 52 has been blanked by the outer head of valve 49, the ports 58 and 61 are simultaneously exposed by the reduced portion of the valve 49 and thus connected with each other and with the brake pipe port 54.

*Operation*

In running position of the engineer's brake valve, to which the valve is moved from release position, air is supplied from reservoir 6 through feed valve 12 and pipe 59 to the brake valve 8, and thence flows to charge reservoir 9 and brake pipes 13 and 14.

Air flowing from the brake pipes to the connected triple valves shifts the triple valves to release position (shown in Fig. 1) in which pressure fluid is exhausted from the brake cylinder 22, and both reservoirs 19 and 21 are charged.

To make a service application the valve 8 is manipulated to service and then to lap position to establish and then retain a reduced pressure in equalizing reservoir 9. This pressure acting on the piston of the equalizing discharge valve in opposition to brake pipe pressure causes the latter valve to vent pressure from brake pipe connection 53. The normal action is to establish in the brake pipe a pressure equal to that in reservoir 9.

Reduction of brake pipe pressure causes a brake application, and if the resulting deceleration exceeds the rate determined by the strength of spring 51 and this setting is such as to produce the maximum application permissible without danger of locking the wheels, mass 41 will shift valve 49 to disconnect pipes 53 and 55, cutting off the engineer's brake valve and preventing further brake pipe venting. If the deceleration be too rapid the valve 49 will be shifted further exposing ports 58 and 61 and raising the pressure in the brake pipe and reservoir 9 equally. This will cause a corresponding partial release of the brakes, and when the proper decelerative rate is reached valve 49 will again blank ports 58 and 61.

Thus if a short stop is desired the engineer may make a heavier service reduction than is necessary to produce the desired deceleration, and the deceleration controller graduates this application off to maintain an even deceleration to a state of rest.

The deceleration controller illustrated in Fig. 1 is for single end service in which the train runs in one direction.

For double end service the device can be rendered indifferent to the direction of motion of the train as indicated in Fig. 2. In this figure the inertia mass 41 is supported as before but there is no limit stop corresponding to the part 56. The mass 41a has a pin and slot connection 48b with lever 48a which is fulcrumed at 47a. Lever 48a does not react directly on valve 49a but a U-shaped floating lever 65 is interposed and is arranged to fulcrum selectively about lugs 66 and 67. Thus lever 65 and lugs 66 and 67 serve as a positioning stop for the neutral position of valve 49a and converts two way angular displacement of lever 48a into one-way thrust on valve 49a. The leverage ratio is the same in both relations.

Various modifications are obviously possible. In fact the showing has been simplified so far as possible to illustrate clearly the essential principles of the invention. In the commercial embodiment of the invention many refinements familiar to those skilled in the art would be incorporated, without however materially affecting the principle of the invention.

What is claimed is,—

1. In a fluid pressure brake system, the combination of a train pipe; at least one fluid pressure braking unit connected with the train pipe and arranged to be actuated by variations of fluid pressure in said pipe; a reservoir; means responsive to pressure in said reservoir for controlling the pressure in said pipe; manually operable valve means for establishing desired pressures in said reservoir; and valve means responsive to the deceleration produced by an application of the brakes for modifying the pressures in said reservoir and in said pipe in consonance with one another.

2. In a fluid pressure brake system, the combination of a train pipe; at least one fluid pressure braking unit connected with the train pipe and arranged to be actuated by variations of fluid pressure in said pipe; a reservoir; means responsive to pressure in said reservoir for controlling the pressure in said pipe; manually operable valve means for establishing desired pressures in said reservoir; and valve means having a graduated action and arranged to respond in accordance with the rate of deceleration produced by a brake application, for modifying the pressures in said reservoir and in said pipe in consonance with one another.

3. In an automatic fluid pressure brake system, the combination of a brake pipe; at least one braking unit including an automatic brake valve connected with said brake pipe; an engineer's brake valve of the equalizing discharge type, including an equalizing reservoir; and valve means responsive to the deceleration produced by an application of the brakes and exercising a secondary control on the pressure in said equalizing reservoir.

4. In an automatic fluid pressure brake system, the combination of a brake pipe; at least one braking unit including an automatic brake valve connected with said brake pipe; an engineer's brake valve of the equalizing discharge type, including an equalizing reservoir; and valve means having a graduated action and arranged to respond in accordance with the rate of deceleration produced by an application of the brakes for modifying the pressure in said equalizing reservoir.

5. In an automatic fluid pressure brake system, the combination of a brake pipe; at least one braking unit including an automatic brake valve connected with said brake pipe; an engineer's brake valve of the equalizing discharge type, including an equalizing reservoir; and valve means having a graduated action and arranged to respond in accordance with the rate of deceleration produced by an application of the brakes for modifying the pressures in said equalizing reservoir and in said brake pipe in consonance with one another.

6. In an automatic fluid pressure brake system, the combination of a brake pipe; at least one braking unit including an automatic brake valve of the graduated release type connected with said brake pipe; an engineer's brake valve of the equalizing discharge type, including an equalizing reservoir; and valve means responsive to the deceleration produced by an application of the brakes and exercising a secondary control on the pressure in said equalizing reservoir.

7. In an automatic fluid pressure brake system, the combination of a brake pipe; at least one braking unit including an automatic brake valve of the graduated release type connected with said brake pipe; an engineer's brake valve of the equalizing discharge type, including an equalizing reservoir; and valve means having a graduated action and arranged to respond in accordance with the rate of deceleration produced by an application of the brakes for modifying the pressure in said equalizing reservoir.

8. In an automatic fluid pressure brake system, the combination of a brake pipe; at least one braking unit including an automatic brake valve of the graduated release type connected with said brake pipe; an engineer's brake valve of the equalizing discharge type, including an equalizing reservoir; and valve means having a graduated action and arranged to respond in accordance with the rate of deceleration produced by an application of the brakes for modifying the pressures in said equalizing reservoir and in said brake pipe in consonance with one another.

9. In an automatic fluid pressure brake system, the combination of a brake pipe; at least one braking unit including an automatic brake valve of the graduated release type connected with said brake pipe; an engineer's brake valve of the equalizing discharge type, including an equalizing reservoir; and valve means of the combined admission and exhaust type, responsive to the deceleration produced by an application of the brakes and exercising a secondary control on the pressure in said equalizing reservoir.

10. In an automatic fluid pressure brake system, the combination of a brake pipe; at least one braking unit including an automatic brake valve of the graduated release type connected with said brake pipe; an engineer's brake valve of the equalizing discharge type, including an equalizing reservoir; and graduating admission and exhaust valve means arranged to respond in accordance with the rate of deceleration produced by an application of the brakes for modifying the pressures in said equalizing reservoir and in said brake pipe in consonance with one another.

11. In an automatic fluid pressure brake system, the combination of a brake pipe; at least one braking unit including an automatic brake valve of the graduated release type connected with said brake pipe; an engineer's brake valve of the equalizing discharge type including an equalizing reservoir, said brake valve being normally connected to control the pressure in said brake pipe; and valve means responsive to the deceleration produced by an application of the brakes and serving in response to deceleration above a chosen value to disconnect said brake valve from said brake pipe and then increase the pressure in said brake pipe.

12. In an automatic fluid pressure brake system, the combination of a brake pipe; at least one braking unit including an automatic brake valve of the graduated release type connected with said brake pipe; an engineer's brake valve of the equalizing discharge type including an equalizing reservoir, said brake valve being normally connected to control the pressure in said brake pipe; and valve means responsive to the deceleration produced by an application of the brakes and serving in response to deceleration above a chosen value to disconnect said brake valve from said brake pipe and then increase the pressure in said equalizing reservoir and in said brake pipe in consonance with one another.

13. In an automatic fluid pressure brake system, the combination of a brake pipe; at least one braking unit including an automatic brake valve of the graduated release type connected with said brake pipe; an engineer's brake valve of the equalizing discharge type including an equalizing reservoir, said brake valve being normally connected to control the pressure in said brake pipe; and valve means having a graduated action and arranged to respond in accordance with the rate of deceleration produced by an application of the brakes for disconnecting said brake valve from said brake pipe and modifying the pressure in said brake pipe to maintain a uniform rate of deceleration.

14. In an automatic fluid pressure brake system, the combination of a brake pipe; at least one braking unit including an automatic brake valve of the graduated release type connected with said brake pipe; an engineer's brake valve of the equalizing discharge type including an equalizing reservoir, said brake valve being normally connected to control the pressure in said brake pipe; and valve means having a graduated action and arranged to respond in accordance with the rate of deceleration produced by an application of the brakes for modifying the pressures in said equalizing reservoir and in said brake pipe in consonance with one another, the modification of brake pipe pressure being substantially such as to maintain a uniform rate of deceleration.

15. In an automatic fluid pressure brake system, the combination of a brake pipe; at least one braking unit including an automatic brake valve of the graduated release type connected with said brake pipe; an engineer's brake valve of the equalizing discharge type including an equalizing reservoir, said brake valve being normally connected to control the pressure in said pipe; and valve means arranged to respond in accordance with the rate of deceleration produced by an application of the brakes, said valve means serving when the rate of deceleration exceeds a chosen value, to disconnect said brake valve from said brake pipe, connect the brake pipe with the equalizing reservoir, and admit pressure fluid to the brake pipe.

CHARLES A. CAMPBELL.